(12) United States Patent
Zhang et al.

(10) Patent No.: US 8,845,480 B2
(45) Date of Patent: Sep. 30, 2014

(54) COMPOUND PLANETARY GEAR MECHANISM

(71) Applicant: Kabushiki Kaisha Yaskawa Denki, Kitakyushu (JP)

(72) Inventors: Wennong Zhang, Kitakyushu (JP); Hiroshi Nakamura, Kitakyushu (JP); Yasuo Kishi, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/873,237

(22) Filed: Apr. 30, 2013

(65) Prior Publication Data

US 2013/0237368 A1    Sep. 12, 2013

Related U.S. Application Data

(63) Continuation of application No. PCT/JP2011/067451, filed on Jul. 29, 2011.

(30) Foreign Application Priority Data

Nov. 1, 2010    (JP) ................. 2010-245243

(51) Int. Cl.
*F16H 1/46*    (2006.01)
(52) U.S. Cl.
CPC ....................... *F16H 1/46* (2013.01)
USPC .......................................................... 475/331
(58) Field of Classification Search
CPC .................................. F16H 1/46; F16H 57/082
USPC ........................................................ 475/331
See application file for complete search history.

(56) References Cited

U.S. PATENT DOCUMENTS 5,342,257 A * 8/1994 Hotta et al. ................. 475/275
6,190,280 B1 * 2/2001 Horsch .......................... 475/209

(Continued)

FOREIGN PATENT DOCUMENTS

| JP | 54-183566 U | 12/1979 |
| JP | 63-064661 B2 | 2/1985 |
| JP | 2008-275112 | 11/2008 |
| WO | WO 2007/017935 | 2/2007 |

OTHER PUBLICATIONS

International Search Report for corresponding International Application No. PCT/JP2011/067451, Oct. 25, 2011.

(Continued)

*Primary Examiner* — Robert A Siconolfi
*Assistant Examiner* — Huan Le
(74) *Attorney, Agent, or Firm* — Mori & Ward, LLP

(57) ABSTRACT

A compound planetary gear mechanism includes at least two planetary gear mechanisms and a carrier. The at least two planetary gear mechanisms include a first planetary gear mechanism and a second planetary gear mechanism. The first planetary gear mechanism includes a plurality of first planetary gears. The second planetary gear mechanism includes a plurality of second planetary gears. The carrier is coupled to the plurality of first planetary gears and the plurality of second planetary gears. The carrier includes a first support shaft and a second support shaft. The first support shaft rotatably supports a first planetary gear among the plurality of first planetary gears. The second support shaft rotatably supports a second planetary gear among the plurality of second planetary gears and is independent of the first support shaft.

8 Claims, 2 Drawing Sheets

(56) References Cited

U.S. PATENT DOCUMENTS

| | | |
|---|---|---|
| 6,546,889 B1 * | 4/2003 | Jacob et al. .............. 114/144 R |
| 6,585,620 B1 * | 7/2003 | Bae .............................. 475/331 |
| 2010/0120574 A1 * | 5/2010 | Maekawa ..................... 475/331 |
| 2010/0167867 A1 | 7/2010 | Sugitani |
| 2011/0009232 A1 * | 1/2011 | Kapelevich ................. 475/331 |
| 2012/0302392 A1 * | 11/2012 | Liu ............................ 475/269 |

OTHER PUBLICATIONS

Written Opinion for corresponding International Application No. PCT/JP2011/067451, Oct. 25, 2011.

\* cited by examiner

COMPOUND PLANETARY GEAR MECHANISM

CROSS-REFERENCE TO RELATED APPLICATIONS

The present application is a continuation application of International Application No. PCT/JP2011/067451, filed Jul. 29, 2011, which claims priority to Japanese Patent Application No. 2010-245243, filed Nov. 1, 2010. The contents of these applications are incorporated herein by reference in their entirety.

BACKGROUND OF THE INVENTION

1. Field of the Invention

The present invention relates to a compound planetary gear mechanism.

2. Discussion of the Background

Compound planetary gear mechanisms are equipped with a plurality of planetary gear mechanisms and are in use in a variety of fields in that the plurality of planetary gear mechanisms realize high rotation ratio (high reduction gear ratio or high speed-increasing ratio) that is difficult to realize by a single planetary gear mechanism. Conventional compound planetary gear mechanisms are disclosed in, for example, WO2007/017935 and Japanese Unexamined Patent Application Publication No. 2008-275112.

The compound planetary gear mechanism according to WO2007/017935 includes two planetary gear mechanisms coupled to one another. Each planetary gear mechanism includes a sun gear and two planetary gears. The sun gear and two planetary gears of each planetary gear mechanism are coaxial to and integral with the respective, corresponding sun gear and two planetary gears of the other planetary gear mechanism. Likewise, the compound planetary gear mechanism according to Japanese Unexamined Patent Application Publication No. 2008-275112 includes two planetary gear mechanisms coupled to one another. One of the two planetary gear mechanisms includes a plurality of planetary gears disposed in a nonaxisymmetric manner.

SUMMARY OF THE INVENTION

According to one aspect of the present invention, a compound planetary gear mechanism includes at least two planetary gear mechanisms and a carrier. The at least two planetary gear mechanisms include a first planetary gear mechanism and a second planetary gear mechanism. The first planetary gear mechanism includes a plurality of first planetary gears. The second planetary gear mechanism includes a plurality of second planetary gears. The carrier is coupled to the plurality of first planetary gears and the plurality of second planetary gears. The carrier includes a first support shaft and a second support shaft. The first support shaft rotatably supports a first planetary gear among the plurality of first planetary gears. The second support shaft rotatably supports a second planetary gear among the plurality of second planetary gears and is independent of the first support shaft.

According to another aspect of the present invention, a compound planetary gear mechanism includes two planetary gear mechanisms. The two planetary gear mechanisms include six rotational elements made up of pivotal rotation of sun gears, orbital rotation of planetary gears, and pivotal rotation of outer gears of the respective two planetary gear mechanisms. Two rotational elements among the six rotational elements are coupled to one another so that the compound planetary gear mechanism as a whole comprises four rotational elements. The two planetary gear mechanisms both satisfy all of a coaxial condition, an assembly condition, and an adjacent condition.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
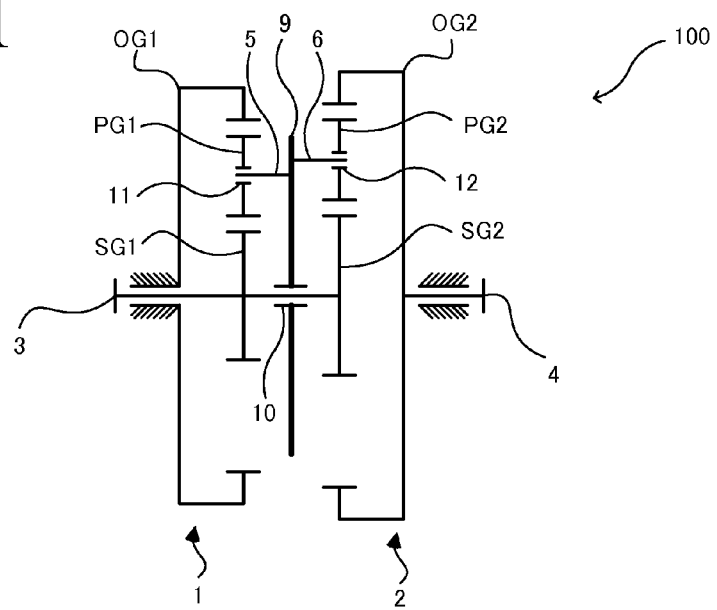
FIG. 1 is a skeleton diagram of a compound planetary gear mechanism according to a first embodiment.

The embodiments will now be described with reference to the accompanying drawings, wherein like reference numerals designate corresponding or identical elements throughout the various drawings.

First Embodiment

Figure 2:
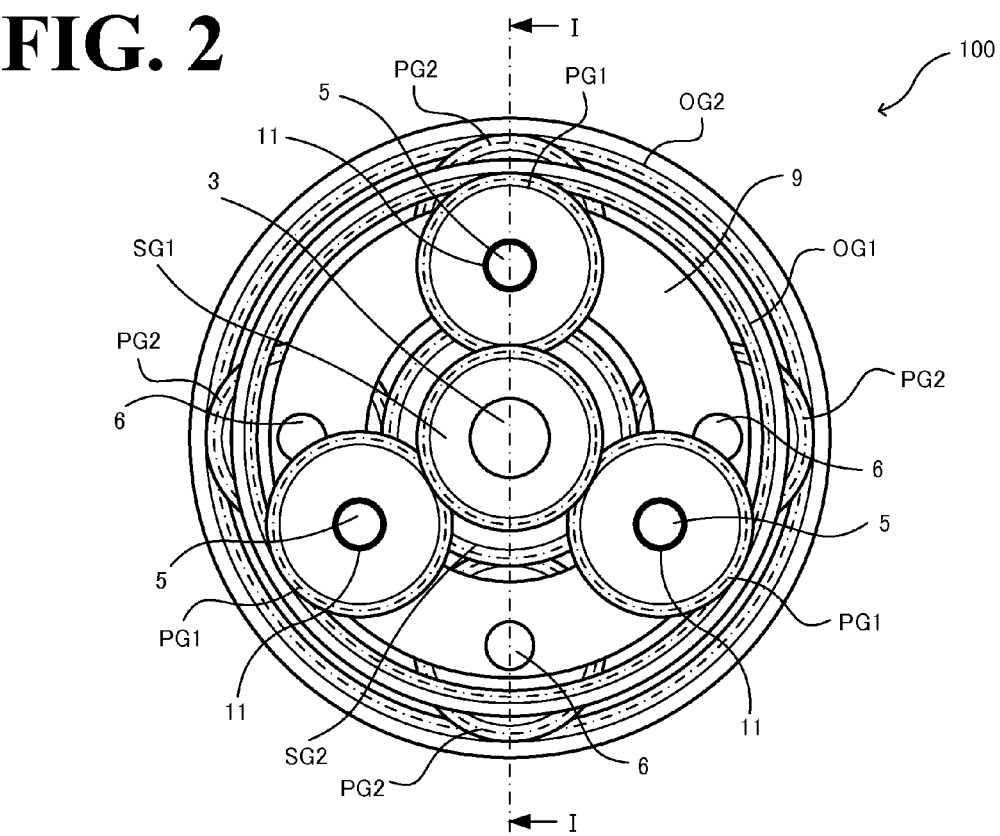
FIG. 2 is a front view of the compound planetary gear mechanism according to the first embodiment, illustrating a schematic configuration of the compound planetary gear mechanism.

First, by referring to FIGS. 1 and 2, a configuration of a compound planetary gear mechanism according to the first embodiment will be described. As shown in FIGS. 1 and 2, a compound planetary gear mechanism 100 according to this embodiment includes two planetary gear mechanisms, that is, a first planetary gear mechanism 1 and a second planetary gear mechanism 2.

The first planetary gear mechanism 1 includes a first sun gear SG1, a first outer gear OG1, and a plurality of first planetary gears PG1. The first outer gear OG1 is an internally-toothed gear. The plurality of first planetary gears PG1 mesh with the first sun gear SG1 and the first outer gear OG1, and rotate about the first planetary gears PG1 while making orbital rotation. To the center of the first sun gear SG1, an input shaft 3 is secured. The first outer gear OG1 is secured to a stationary frame.

The second planetary gear mechanism 2 includes a second sun gear SG2, a second outer gear OG2, and a plurality of second planetary gears PG2. The second sun gear SG2 is coaxial to and integral with the first sun gear SG1. The second outer gear OG2 is an internally-toothed gear. The plurality of second planetary gears PG2 mesh with the second sun gear SG2 and the second outer gear OG2, and rotate about the second planetary gears PG2 while making orbital rotation. To the center of the second outer gear OG2, an output shaft 4 is secured.

The first planetary gear mechanism 1 and the second planetary gear mechanism 2 share a common carrier 9 coupled between the plurality of first planetary gears PG1 and the plurality of second planetary gears PG2. The common carrier 9 includes a first planetary support shaft 5 and a second planetary support shaft 6. The first planetary support shaft 5 rotatably supports the first planetary gear PG1. The second planetary support shaft 6 rotatably supports the second planetary gear PG2. Specifically, the first planetary support shaft 5 is independently disposed on the surface of the common carrier 9 on the side of the first planetary gear mechanism 1, while the second planetary support shaft 6 is independently disposed on the surface of the common carrier 9 on the side of the second planetary gear mechanism 2. At a center portion of the common carrier 9, a bearing 10 is disposed to rotatably support the input shaft 3. The input shaft 3 is secured by being passed through the bearing 10, which makes the common carrier 9 rotatable about the input shaft 3.

The first planetary gear PG1 includes, at its center portion, a first bearing 11 rotatably supporting the first planetary support shaft 5. The second planetary gear PG2 includes, at its center portion, a second bearing 12 rotatably supporting the second planetary support shaft 6. The first planetary support shaft 5 and the second planetary support shaft 6 are secured by being passed respectively through the first bearing 11 and the second bearing 12. This makes the first planetary gear PG1 and the second planetary gear PG2 rotatable (rotatable about themselves) respectively about the first planetary support shaft 5 and the second planetary support shaft 6 while making orbital rotation with the common carrier 9.

The first planetary support shaft 5 and the second planetary support shaft 6 are disposed at different positions on the common carrier 9 in at least one direction among the radial direction and the circumferential direction. For example, in the example shown in FIGS. 1 and 2, the first planetary support shaft 5 and the second planetary support shaft 6 located at the upper part of FIG. 2 (which are the ones shown in FIG. 1) are aligned in the circumferential direction but displaced from one another in the radial direction. The other pairs of the first planetary support shaft 5 and the second planetary support shaft 6 are disposed at different positions in both the radial direction and the circumferential direction. This ensures that the first planetary gear PG1 and the second planetary gear PG2 are disposed at different positions in at least one direction among the radial direction and the circumferential direction. This, as a result, ensures that the first planetary gear PG1 and the second planetary gear PG2 are freely disposed at suitable positions on the common carrier 9, and that the number of the planetary gears can differ between the first planetary gear mechanism 1 and the second planetary gear mechanism 2. For example, in the example shown FIGS. 1 and 2, the first planetary gear mechanism 1 includes three first planetary gears PG1, while the second planetary gear mechanism 2 includes four second planetary gears PG2.

In the above description, the common carrier 9 corresponds to the carrier recited in the appended claims, and the first planetary support shaft 5 and the second planetary support shaft 6 respectively correspond to the first support shaft and the second support shaft recited in the appended claims.

Thus, in the compound planetary gear mechanism 100 according to this embodiment, due to the integrity of the sun gears SG1 and SG2 and due to the common carrier 9, two rotational elements are coupled to one another among six rotational elements made up of: pivotal rotation of the sun gears SG1 and SG2, orbital rotation of the planetary gears PG1 and PG2, and pivotal rotation of the outer gears OG1 and OG2 of the planetary gear mechanisms 1 and 2. As a result, the compound planetary gear mechanism 100 as a whole has four rotational elements. The following describes how this configuration realizes a high reduction gear ratio, high accuracy, and high efficiency.

A single planetary gear mechanism has such a property that the ratio of the difference in rotational speed between the outer gear and the carrier and the difference in rotational speed between the sun gear and the carrier equals to the negative value of the ratio of number of teeth between the sun gear and the outer gear.

In the first planetary gear mechanism 1, it will be assumed that the numbers of teeth of the first sun gear SG1, the first planetary gear PG1, and the first outer gear OG1 are respectively $Z_{S1}$, $Z_{P1}$, and $Z_{O1}$, and that the rotational speeds of the first sun gear SG1, the first planetary gear PG1, and the first outer gear OG1 are respectively $\omega_{S1}$, $\omega_{P1}$, and $\omega_{O1}$. In the second planetary gear mechanism 2, it will be assumed that the numbers of teeth of the second sun gear SG2, the second planetary gear PG2, and the second outer gear OG2 are respectively $Z_{S2}$, $Z_{P2}$, and $Z_{O2}$, and that the rotational speeds of the second sun gear SG2, the second planetary gear PG2, and the second outer gear OG2 are respectively $\omega_{S2}$, $\omega_{P2}$, and $\omega_{O2}$. It also will be assumed that the rotational speed of the common carrier 9 is $\omega_C$. Under these assumptions, the above-described property provides speed relationships represented by Equation (1) and Equation (2).

$$(\omega_{O1}-\omega_C)/(\omega_{S1}-\omega_C)=-Z_{S1}/Z_{O1} \qquad (1)$$

$$(\omega_{O2}-\omega_C)/(\omega_{S2}-\omega_C)=-Z_{S2}/Z_{O2} \qquad (2)$$

In this respect, since the first outer gear OG1 is secured to the stationary frame, $\omega_{O1}=0$. Additionally, since the first sun gear SG1 and the second sun gear SG2 are integral with one another with their rotation axis being the input shaft 3, $\omega_{S1}=\omega_{S2}=\omega_{in}$. It is noted, however, that $\omega_{in}$ is the rotational speed of the input shaft 3. Accordingly, Equation (1) and Equation (2) respectively result in Equation (3) and Equation (4).

$$-\omega_C/(\omega_{in}-\omega_C)=Z_{S1}/Z_{O1} \qquad (3)$$

$$(\omega_{O2}-\omega_C)/(\omega_{in}-\omega_C)=-Z_{S2}/Z_{O2} \qquad (4)$$

From Equation (3), Equation (5) is obtained.

$$\omega_C=\omega_{in}\cdot Z_{S1}/(Z_{S1}+Z_{O1}) \qquad (5)$$

Equation (5) is substituted into Equation (4), which is in turn arranged into Equation (6).

[Mathematical Formula 1]

$$\frac{Z_{S1}+Z_{O1}}{Z_{O1}}\cdot\frac{\omega_{O2}}{\omega_{in}}=\frac{Z_{S1}}{Z_{O1}}-\frac{Z_{S2}}{Z_{O2}} \qquad (6)$$

The rotation axis of the second outer gear OG2 serves as the output shaft, and with its rotational speed assumed $\omega_{out}$, then a reduction gear ratio U can be represented by Equation (7).

[Mathematical Formula 2]

$$U=\frac{\omega_{out}}{\omega_{in}}=\frac{\omega_{O2}}{\omega_{in}}=\left(\frac{Z_{S1}}{Z_{O1}}-\frac{Z_{S2}}{Z_{O2}}\right)\bigg/\left(1+\frac{Z_{S1}}{Z_{O1}}\right) \qquad (7)$$

According to Equation (7), by setting the numbers of teeth of the first sun gear SG1, the first outer gear OG1, the second sun gear SG2, and the second outer gear OG2 so that the ratio of number of teeth between the first sun gear SG1 and the first outer gear OG1 is sufficiently close to the ratio of number of teeth between the second sun gear SG2 and the second outer gear OG2, the reduction gear ratio U can be approximated to 0. That is, a high reduction gear ratio can be accomplished.

To realize high accuracy and high efficiency, it is necessary to satisfy a coaxial condition for a planetary gear mechanism. The coaxial condition means that the number of teeth of the outer gear equals to the sum of the number of teeth of the sun gear and twice the number of teeth of the planetary gears. Equation (8) and Equation (9) respectively formulate the coaxial conditions for the first planetary gear mechanism 1 and the second planetary gear mechanism 2.

$$Z_{O1}=Z_{S1}+2Z_{P1} \quad (8)$$

$$Z_{O2}=Z_{S2}+2Z_{P2} \quad (9)$$

Also to realize high accuracy and high efficiency, it is also necessary to satisfy an assembly condition for a planetary gear mechanism. The assembly condition means that the sum of the number of teeth of the outer gear and the number of teeth of the sun gear is an integral multiple of the number of the planetary gears. Equation (10) and Equation (11) respectively formulate the assembly conditions for the first planetary gear mechanism 1 and the second planetary gear mechanism 2.

$$Z_{S1}+Z_{O1}=N_1 n_1 \quad (10)$$

$$Z_{S2}+Z_{O2}=N_2 n_2 \quad (11)$$

where $N_1$ and $N_2$ respectively represent the numbers of the planetary gears PG1 and PG2 of the first planetary gear mechanism 1 and the second planetary gear mechanism 2. Also, $n_1$ and $n_2$ are each a natural number.

Further, to avoid interference between adjacent planetary gears coming into contact with each other, it is necessary to satisfy an adjacent condition represented by Equation (12) and Equation (13).

$$Z_{P1}+2<2(Z_{S1}+Z_{P1})\sin(\pi/N_1) \quad (12)$$

$$Z_{P2}+2<2(Z_{S2}+Z_{P2})\sin(\pi/N_2) \quad (13)$$

Here, the above-described configuration of the compound planetary gear mechanism 100 according to this embodiment eliminates any restrictive conditions between the first planetary gear mechanism 1 and the second planetary gear mechanism 2. Hence, by suitably setting the eight undetermined numbers, $Z_{O1}$, $Z_{S1}$, $Z_{P1}$, $N_1$, $Z_{O2}$, $Z_{S2}$, $Z_{P2}$, and $N_2$, a high reduction gear ratio is easily realized with all of the six conditions specified in Equations (8) to (13) being satisfied.

Next, specific examples of the eight undetermined numbers, $Z_{O1}$, $Z_{P1}$, $N_1$, $Z_{O2}$, $Z_{S2}$, $Z_{P2}$, and $N_2$, will be described.

There are countless combinations of undetermined numbers to realize a certain range of reduction gear ratio with the coaxial condition, the assembly condition, and the adjacent condition specified in Equations (8) to (13). In view of this, in an attempt to obtain a finite number of solutions, the inventors prepared a program based on Equations (7) to (13) and conducted a simulation while suitably specifying the numerical ranges of: the minimum, $N_{min}$, and the maximum, $N_{max}$, of the number of the planetary gears; the minimum number of teeth, $Z_{min}$, of the planetary gears; the maximum, $Z_{max}$, of the sum of numbers of teeth of the sun gear and the outer gear; and the minimum, $U_{min}$, and the maximum, $U_{max}$, of the absolute value of the reduction gear ratio.

For example, with $N_{min}=3$, $N_{max}=4$, $Z_{min}=5$, $N_{max}=40$, $U_{min}=1/105$, and $U_{max}=1/95$, 12 patterns listed in Table 1 were obtained.

TABLE 1

| Patterns | $Z_{S1}:Z_{P1}:Z_{O1}$ | $N_1$ | $Z_{S2}:Z_{P2}:Z_{O2}$ | $N_2$ | U |
|---|---|---|---|---|---|
| 1 | 5:7:19 | 3 | 6:9:24 | 3 | 1/96 |
| 2 | 5:7:19 | 3 | 8:12:32 | 4 | 1/96 |
| 3 | 6:9:24 | 3 | 5:7:19 | 4 | −1/95 |
| 4 | 5:10:25 | 3 | 7:13:33 | 4 | −1/99 |

TABLE 1-continued

| Patterns | $Z_{S1}:Z_{P1}:Z_{O1}$ | $N_1$ | $Z_{S2}:Z_{P2}:Z_{O2}$ | $N_2$ | U |
|---|---|---|---|---|---|
| 5 | 11:7:25 | 3 | 10:6:22 | 4 | −1/99 |
| 6 | 8:10:28 | 3 | 6:8:22 | 4 | 99 |
| 7 | 6:12:30 | 3 | 7:13:33 | 4 | −1/99 |
| 8 | 5:7:19 | 4 | 8:12:32 | 4 | 1/96 |
| 9 | 6:8:22 | 4 | 8:10:28 | 4 | −98 |
| 10 | 11:5:21 | 4 | 14:6:26 | 4 | −1/104 |
| 11 | 10:6:22 | 4 | 11:7:25 | 4 | 1/100 |
| 12 | 6:12:30 | 4 | 7:13:33 | 4 | −1/99 |

As seen from the results shown in Table 1, in the compound planetary gear mechanism 100, both the first planetary gear mechanism 1 and the second planetary gear mechanism 2 realize a high reduction gear ratio while satisfying all of the coaxial condition, the assembly condition, and the adjacent condition. Additionally, since a high reduction gear ratio is realized in spite of a comparatively small number of teeth of each of the gears, the compound planetary gear mechanism 100 can be said to have a compact configuration.

For another example, with $N_{min}=3$, $N_{max}=6$, $Z_{min}=18$, $N_{max}=85$, $U_{min}=1/105$, and $U_{max}=1/95$, 12 patterns listed in Table 2 were obtained.

TABLE 2

| Patterns | $Z_{S1}:Z_{P1}:Z_{O1}$ | $N_1$ | $Z_{S2}:Z_{P2}:Z_{O2}$ | $N_2$ | U |
|---|---|---|---|---|---|
| 1 | 21:18:57 | 3 | 22:20:62 | 3 | 1/100.75 |
| 2 | 21:18:57 | 3 | 22:20:62 | 4 | 1/100.75 |
| 3 | 21:18:57 | 3 | 22:20:62 | 6 | 1/100.75 |
| 4 | 18:21:60 | 3 | 20:22:64 | 3 | −1/104 |
| 5 | 18:21:60 | 3 | 20:22:64 | 4 | −1/104 |
| 6 | 18:21:60 | 3 | 20:22:64 | 6 | −1/104 |
| 7 | 22:20:62 | 3 | 21:18:57 | 6 | −1/99.75 |
| 8 | 20:22:64 | 3 | 18:21:60 | 6 | 1/105 |
| 9 | 22:20:62 | 4 | 21:18:57 | 6 | −1/99.75 |
| 10 | 20:22:64 | 4 | 18:21:60 | 6 | 1/105 |
| 11 | 21:18:57 | 6 | 22:20:62 | 6 | 1/100.75 |
| 12 | 18:21:60 | 6 | 20:22:64 | 6 | −1/104 |

With the patterns listed in Table 2 as well, in the compound planetary gear mechanism 100, both the first planetary gear mechanism 1 and the second planetary gear mechanism 2 realize a high reduction gear ratio while satisfying all of the coaxial condition, the assembly condition, and the adjacent condition. A comparison between patterns 1 to 3 and 11 in Table 2 shows that the number of the planetary gears may be changed only in either the first planetary gear mechanism 1 or the second planetary gear mechanism 2, thereby realizing the same reduction gear ratio. That is, the compound planetary gear mechanism 100 realizes high torque transmission by increasing the number of the planetary gears while maintaining a high reduction gear ratio.

As described hereinbefore, the compound planetary gear mechanism 100 according to this embodiment includes the first planetary gear mechanism 1, the second planetary gear mechanism 2, and the common carrier 9. The common carrier 9 includes the first planetary support shaft 5 to rotatably support the first planetary gear PG1, and the second planetary support shaft 6 independent of the first planetary gear PG1 to rotatably support the second planetary gear PG2. With this configuration, by locating the first planetary support shaft 5 and the second planetary support shaft 6 at suitable positions on the common carrier 9, the first planetary gear PG1 and the second planetary gear PG2 are positioned without imposing any restrictions onto one another. This ensures that by suitably selecting the above-described eight undetermined numbers, $Z_{O1}$, $Z_{S1}$, $Z_{P1}$, $N_1$, $Z_{O2}$, $Z_{S2}$, $Z_{P2}$, and $N_2$, both the first planetary gear mechanism 1 and the second planetary gear mechanism 2 realize a high reduction gear ratio while satisfying all of the coaxial condition, the assembly condition, and the adjacent condition.

It is particularly noted that in this embodiment, the first planetary support shaft 5 and the second planetary support shaft 6 are disposed at different positions on the common carrier 9 in at least one direction among the radial direction and the circumferential direction. This ensures that the first planetary gear PG1 and the second planetary gear PG2 can be disposed at different positions in at least one direction among the radial direction and the circumferential direction. This makes it possible to, for example, differentiate the number of the planetary gears between the first planetary gear mechanism 1 and the second planetary gear mechanism 2, thereby largely increasing the design freedom.

It is also particularly noted that in this embodiment, the first planetary gear PG1 and the second planetary gear PG2 respectively include the first bearing 11 and the second bearing 12 at the respective center portions. This structure ensures that the first planetary gear PG1 and the second planetary gear PG2 are rotatably (rotatably about themselves) coupled to the first planetary support shaft 5 and the second planetary support shaft 6, respectively, which are disposed at suitable positions on the common carrier 9. This ensures a structure in which the first planetary gear PG1 and the second planetary gear PG2 are disposed without imposing any restrictions onto one another.

Second Embodiment

Next, a compound planetary gear mechanism according to a second embodiment will be described by referring to FIG. 3. A compound planetary gear mechanism 200 according to the second embodiment is different from the compound planetary gear mechanism 100 according to the first embodiment in that instead of the carrier being shared by the two planetary gear mechanisms, the outer gears OG1 and OG2 of the two planetary gear mechanisms are integral with one another, in that instead of the first outer gear OG1, a first carrier 7 is secured to the stationary frame, and in that instead of the second outer gear OG2, a second carrier 8 has its center secured to the output shaft 4. The compound planetary gear mechanism 200 according to the second embodiment is otherwise similar to the compound planetary gear mechanism 100 according to the first embodiment. To avoid redundant description for convenience purposes, the following mainly describes those respects that are different from the first embodiment.

Figure 3:
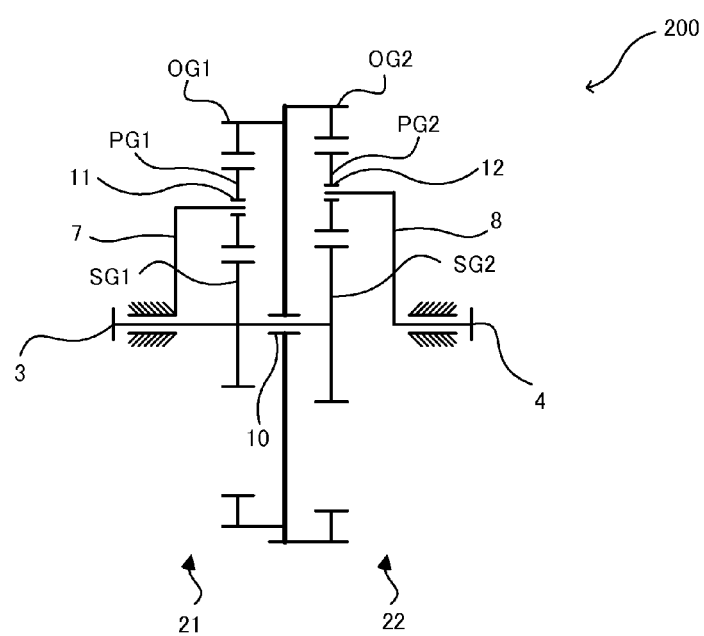
FIG. 3 is a skeleton diagram of a compound planetary gear mechanism according to a second embodiment.

As shown in FIG. 3, the compound planetary gear mechanism 200 according to this embodiment includes two planetary gear mechanisms, that is, a first planetary gear mechanism 21 and a second planetary gear mechanism 22. The first and second planetary gear mechanisms 21 and 22 respectively include outer gears OG1 and OG2 coaxial to and integral with one another. At a center portion of the outer gears OG1 and OG2, a bearing 10 is disposed to rotatably support an input shaft 3. The input shaft 3 is secured by being passed through the bearing 10, and this makes the integrated outer gears OG1 and OG2 rotatable about the input shaft 3.

Thus, in the compound planetary gear mechanism 200 according to this embodiment, due to the integrity of the sun gears SG1 and SG2 and the integrity of the outer gears OG1 and OG2, two rotational elements are coupled to one another among six rotational elements made up of: pivotal rotation of the sun gears SG1 and SG2, orbital rotation of the planetary gears PG1 and PG2, and pivotal rotation of the outer gears OG1 and OG2 of the planetary gear mechanisms 21 and 22. As a result, the compound planetary gear mechanism 200 as a whole has four rotational elements. Next, the following describes how this configuration realizes a high reduction gear ratio, high accuracy, and high efficiency.

With the rotational speeds of the first carrier 7 and the second carrier 8 respectively assumed $\omega_{C1}$ and $\omega_{C2}$, the above-described property of a planetary gear mechanism provides speed relationships represented by Equation (14) and Equation (15).

$$(\omega_{O1} - \omega_{C1})/(\omega_{S1} - \omega_{C1}) = Z_{S1}/Z_{O1} \quad (14)$$

$$(\omega_{O2} - \omega_{C2})/(\omega_{S2} - \omega_{C2}) = -Z_{S2}/Z_{O2} \quad (15)$$

Since the first carrier 7 is secured to the stationary frame, $\omega_{C1} = 0$. Additionally, since the first outer gear OG1 and the second outer gear OG2 are integral with one another, $\omega_{O1} = \omega_{O2} = \omega_O$. Similarly to the first embodiment, the first sun gear SG1 and the second sun gear SG2 are integral with one another with their rotation axis being the input shaft 3, $\omega_{S1} = \omega_{S2} = \omega_{in}$. It is noted, however, that $\omega_{in}$ is the rotational speed of the input shaft 3. Accordingly, Equation (14) and Equation (15) respectively result in Equation (16) and Equation (17).

$$\omega_O/\omega_{in} = -Z_{S1}/Z_{O1} \quad (16)$$

$$(\omega_O - \omega_{C2})/(\omega_{in} - \omega_{C2}) = -Z_{S2}/Z_{O2} \quad (17)$$

From Equation (16), Equation (18) is obtained.

$$\omega_O = \omega_{in} \cdot Z_{S1}/Z_{O1} \quad (18)$$

Equation (18) is substituted into Equation (17), which is in turn arranged into Equation (19).
[Mathematical Formula 3]

$$\frac{Z_{S1} + Z_{O1}}{Z_{O1}} \cdot \frac{\omega_{C2}}{\omega_{in}} = \frac{Z_{S2}}{Z_{O2}} - \frac{Z_{S1}}{Z_{O1}} \quad (19)$$

The rotation axis of the second carrier 8 serves as the output shaft 4, and the reduction gear ratio U can be represented by Equation (20).

[Mathematical Formula 4]

$$U = \frac{\omega_{out}}{\omega_{in}} = \frac{\omega_{C2}}{\omega_{in}} = \left(\frac{Z_{S2}}{Z_{O2}} - \frac{Z_{S1}}{Z_{O1}}\right) / \left(1 + \frac{Z_{S1}}{Z_{O1}}\right) \quad (20)$$

A comparison between Equation (7) and Equation (20) shows that the sign is the only difference between the reduction gear ratio of the compound planetary gear mechanism 200 according to this embodiment and the reduction gear ratio of the compound planetary gear mechanism 100 according to the first embodiment, with the magnitude remaining the same. Thus, a high reduction gear ratio can be realized. Similarly to the first embodiment, the above-described configuration of the compound planetary gear mechanism 200 eliminates any restrictive conditions between the first planetary gear mechanism 21 and the second planetary gear mechanism 22. Hence, by suitably setting the eight undetermined numbers, $Z_{O1}$, $Z_{S1}$, $Z_{P1}$, $N_1$, $Z_{O2}$, $Z_{S2}$, $Z_{P2}$, and $N_2$, both the two planetary gear mechanisms 21 and 22 satisfy the coaxial condition, the assembly condition, and the adjacent condition. The compound planetary gear mechanism thus configured provides reduction gear ratios with signs put into reverse relative to the reduction gear ratios U of the patterns listed in Table 1 and Table 2.

Further, with the compound planetary gear mechanism 200 according to this embodiment, the integrity of the two outer gears OG1 and OG2 eliminates the need for a cover in the circumferential direction of the compound planetary gear mechanism 200 in an attempt to prevent entrance of foreign matter. This simplifies the apparatus as a whole.

It is noted that this embodiment should not be construed in a limiting sense, and various modifications are possible without departing from the technical scope of the present invention. Modifications will be described below.

The two embodiments described hereinbefore should not be construed in a limiting sense, and various modifications are possible without departing from the technical scope of the present invention.

For example, in the two embodiments, the two planetary gear mechanisms have been illustrated as having mutually different modules and different numbers of teeth for the sun gears. This, however, should not be construed in a limiting sense. The two planetary gear mechanisms may also have the same modules and the same numbers of teeth for the sun gears. In this case, only a single sun gear is necessary that simultaneously meshes with two planetary gears.

In the first embodiment described above, the first planetary support shaft 5 and the second planetary support shaft 6 have been illustrated as being disposed at different positions in at least one direction among the radial direction and the circumferential direction. This, however, should not be construed in a limiting sense. For example, when the number $N_1$ of the planetary gears of the first planetary gear mechanism 1 equals to the number $N_2$ of the planetary gears of the second planetary gear mechanism 2, a module $m_1$ of the first planetary gear mechanism 1 and a module $m_2$ of the second planetary gear mechanism 2 may be determined to satisfy Equation (21). This ensures that the first planetary support shaft 5 and the second planetary support shaft 6 are at the same positions in the radial direction and the circumferential direction. In this case, the first planetary support shaft 5 and the second planetary support shaft 6 may be coaxial to and integral with one another.

$$m_1(Z_{S1}+Z_{P1})=m_2(Z_{S2}+Z_{P2}) \quad (21)$$

In the second embodiment described above, the two outer gears OG1 and OG2 have been illustrated as being integral with one another. This, however, should not be construed in a limiting sense. For example, when the number $Z_{O1}$ of teeth of the first outer gear OG1 equals to the number $Z_{O2}$ of teeth of the second outer gear OG2, a module $m_1$ of the first planetary gear mechanism 21 and a module $m_2$ of the second planetary gear mechanism 22 may be determined as being equal to one another. This necessitates only a single outer gear that simultaneously meshes with two planetary gears.

In the first embodiment described above, two rotational elements made up of the rotation of the sun gears SG1 and SG2 and the orbital rotation of the planetary gears PG1 and PG2 are coupled to one another due to the integrity of the sun gears SG1 and SG2 and due to the common carrier 9. In the second embodiment described above, two rotational elements made up of the rotation of the sun gears SG1 and SG2 and the rotation of the outer gears OG1 and OG2 are coupled to one another due to the integrity of the sun gears SG1 and SG2 and the integrity of the outer gears OG1 and OG2. These, however, should not be construed in a limiting sense. For example, the sun gears SG1 and SG2 may be separate from one another, and two rotational elements made up of the orbital rotation of the planetary gears PG1 and PG2 and the rotation of the outer gears OG1 and OG2 may be coupled to one another due to the common carrier 9 and the integrity of the outer gears OG1 and OG2.

In the above description, in the compound planetary gear mechanism having four rotational elements as a whole, the sun gear is assigned to the input side, the first outer gear is assigned to the fixed side, and the second outer gear is assigned to the output side in the first embodiment, while in the second embodiment, the sun gear is assigned to the input side, the first planetary gear is assigned to the fixed side, and the second planetary gear is assigned to the output side. The assignment of the input, fixed, and output sides may be conveniently changed. For example, while in the above description the compound planetary gear mechanism has been illustrated as a reduction gear, the assignment of the input side and the output side may be interchanged to implement a step-up gear.

While in the above description the compound planetary gear mechanism has been illustrated as including two planetary gear mechanisms, the compound planetary gear mechanism may include equal to or more than three planetary gear mechanisms.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A compound planetary gear mechanism comprising:
at least two planetary gear mechanisms comprising:
a first planetary gear mechanism comprising a plurality of first planetary gears; and
a second planetary gear mechanism comprising a plurality of second planetary gears; and
a carrier coupled to the plurality of first planetary gears and the plurality of second planetary gears, the carrier comprising:
a first support shaft rotatably supporting a first planetary gear among the plurality of first planetary gears; and
a second support shaft rotatably supporting a second planetary gear among the plurality of second planetary gears and being independent of the first support shaft,
wherein the first planetary gear mechanism and the second planetary gear mechanism are both directly connected to an input shaft,
wherein the plurality of first planetary gears each comprise a first bearing at a center portion of each of the plurality of first planetary gears so as to rotatably support the first support shaft,
wherein the plurality of second planetary gears each comprise a second bearing at a center portion of each of the plurality of second planetary gears so as to rotatably support the second support shaft,
wherein the first planetary gear mechanism comprises a first sun gear and a first outer gear,
wherein the second planetary gear mechanism comprises a second sun gear and a second outer gear,
wherein the first sun gear and the second sun gear are secured to the input shaft and coaxial to and integral with the input shaft,
wherein the first outer gear is secured to a stationary frame, and
wherein the second outer gear is secured to an output shaft.

2. The compound planetary gear mechanism according to claim 1, wherein both the first planetary gear mechanism and the second planetary gear mechanism satisfy all of a coaxial condition, an assembly condition, and an adjacent condition.

3. The compound planetary gear mechanism according to claim 1,
wherein the carrier being sandwiched between the first planetary gear mechanism and the second planetary gear mechanism.

4. The compound planetary gear mechanism according to claim 1, wherein the first support shaft and the second support shaft are disposed at different positions on the carrier in at least one direction among a radial direction and a circumferential direction.

5. The compound planetary gear mechanism according to claim 4, wherein both the first planetary gear mechanism and the second planetary gear mechanism satisfy all of a coaxial condition, an assembly condition, and an adjacent condition.

6. The compound planetary gear mechanism according to claim 4 wherein both the first planetary gear mechanism and the second planetary gear mechanism satisfy all of a coaxial condition, an assembly condition, and an adjacent condition.

7. A compound planetary gear mechanism comprising two planetary gear mechanisms comprising six rotational elements made up of pivotal rotation of sun gears, orbital rotation of planetary gears, and pivotal rotation of outer gears of the respective two planetary gear mechanisms, two rotational elements among the six rotational elements being coupled to one another by a common carrier so that the compound planetary gear mechanism as a whole comprises four rotational elements, the two planetary gear mechanisms both satisfying all of a coaxial condition, an assembly condition, and an adjacent condition,
wherein the two planetary gear mechanisms are both directly connected to an input shaft,
wherein the planetary gears each comprise a bearing at a center portion of each of the planetary gears so as to rotatably support a respective support shaft of the common carrier,
wherein the two planetary gear mechanisms comprise
a first planetary gear mechanism comprising a first sun gear, a plurality of first planetary gears, a first outer gear, and a first carrier, and
a second planetary gear mechanism comprising a second sun gear, a plurality of second planetary gears, a second outer gear, and a second carrier,
wherein the first sun gear and the second sun gear are secured to the input shaft and coaxial to and integral with the input shaft,
wherein the first carrier is secured to a stationary frame,
wherein the first outer gear and the second outer gear are coaxial to and integral with one another and rotatable about the input shaft, and
wherein the second carrier is secured to an output shaft.

8. The compound planetary gear mechanism according to claim 7,
wherein the common carrier being sandwiched between the two planetary gear mechanisms.

* * * * *